Dec. 22, 1925.
R. K. DENNISON
GRAVITY MOBILE VEHICLE
Filed May 6, 1925
1,566,380
2 Sheets-Sheet 1
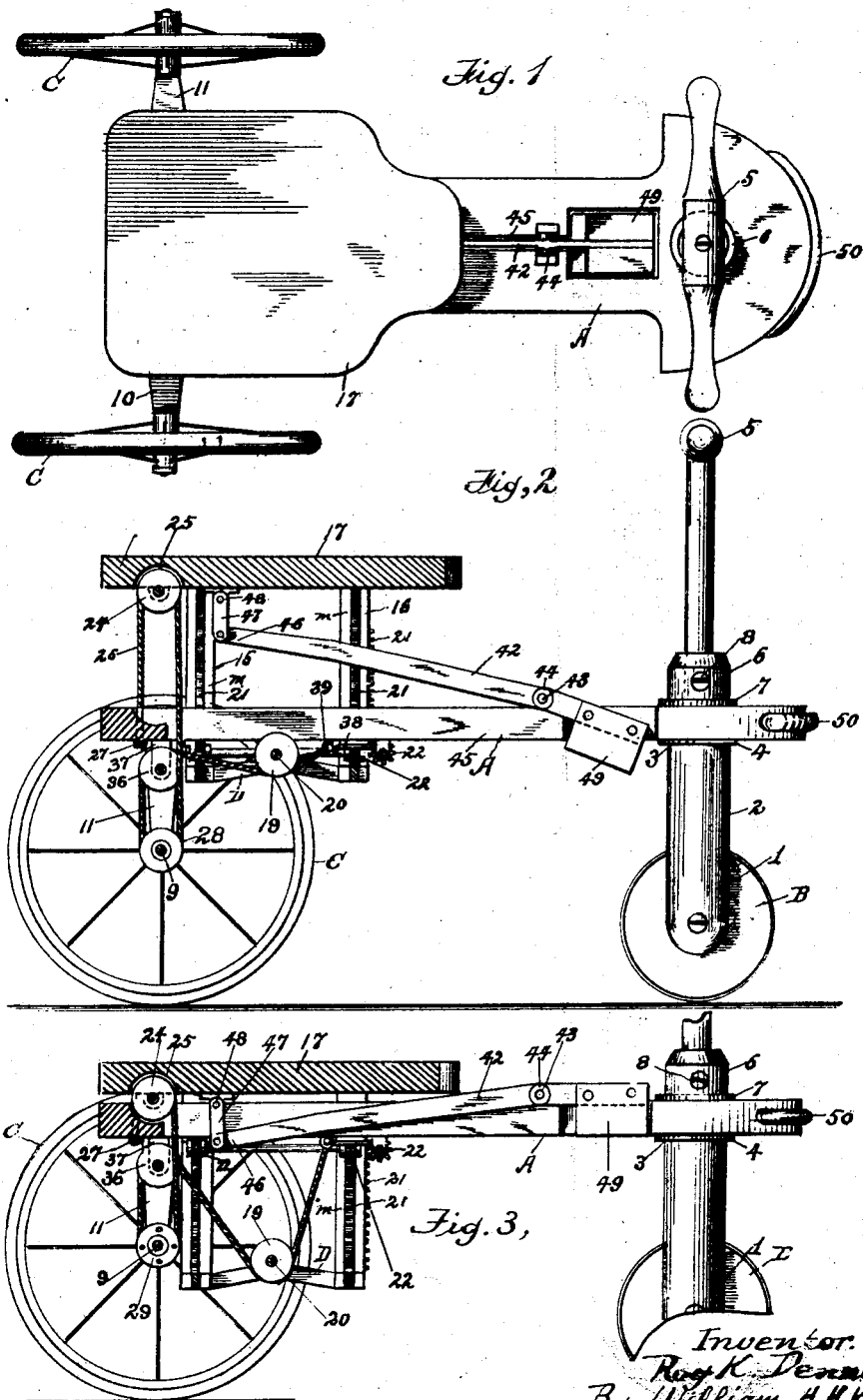

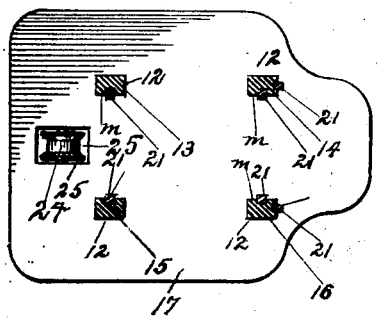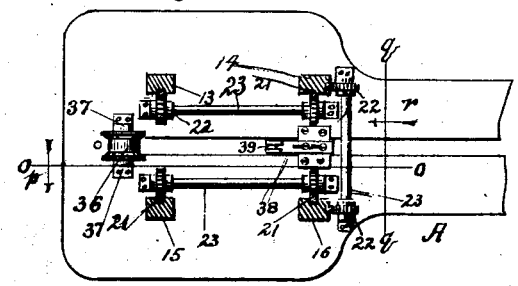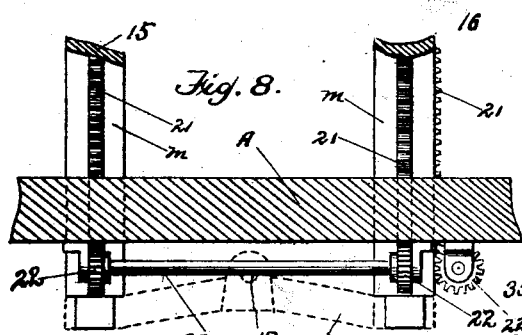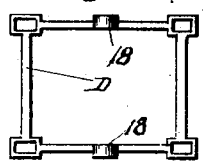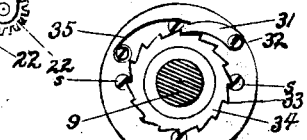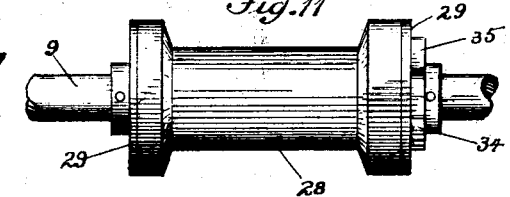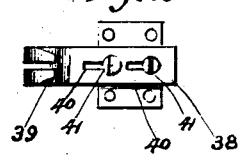

Patented Dec. 22, 1925.

1,566,380

UNITED STATES PATENT OFFICE.

ROY K. DENNISON, OF EAST MACHIAS, MAINE.

GRAVITY MOBILE VEHICLE.

Application filed May 6, 1925. Serial No. 28,406.

*To all whom it may concern:*

Be it known that I, ROY K. DENNISON, a citizen of the United States of America, residing at East Machias, in the county of Washington and State of Maine, have invented certain new and useful Improvements in Gravity Mobile Vehicles, of which the following is a specification.

My present invention, while broadly relating to the general class of velocipedes, has yet more particular relation to that branch of said class known to art as tricycles, and of the latter named, to the well known vehicle for children's use, which, under various names, are in evidence everywhere, and said invention contemplates the provision of a device of the character named which, in practice, is capable of fulfilling a twofold function, to wit: A vehicle in which the weight of the young rider operates to propel it forward to a distance determined by the character of the material upon which the vehicle is supported and moves and also a vehicle which can be propelled from place to place by the walking action of the rider, who, seated upon such vehicle, propels it forward to any desired extent, as will be readily understood.

To the carrying into practice of the foregoing premises and for the purpose of producing a simple, durable and easily actuated device of the character above set forth, my improved gravity mobile vehicle in its present adaptation, consists essentially in the peculiar construction, arrangement and combination with the body and rotatable members of such vehicle, of peculiar means whereby the weight alone of a rider, operates to move said vehicle in forward direction to a predetermined extent.

My invention further consists in the peculiar construction of the seat upon which the rider of such vehicle is supported, the means and manner by and in which such seat is connected to the rotatable members of the vehicle which is to be propelled to move the same and the means whereby such seat is held from becoming jammed or otherwise held from the necessary freedom of downward movement to accomplish the desired result.

My invention further consists in the peculiar construction and adaptation of the device whereby the seat upon which the rider is supported is automatically returned to its normal starting position when the weight of such rider is removed therefrom.

And finally my invention consists in the peculiar construction, arrangement and combination of the several operative devices, comprised in said invention, with each other and with the frame and rotatable members of the vehicle to which they are connected to operate, substantially as is hereinafter described and illustrated in the accompanying drawings, wherein—

Figure 1, is a top plan view of my improved gravity mobile vehicle as it appears when ready for service.

Figures 2 and 3, are side elevations of said vehicle showing respectively the movable seat at its upper and at its lower limit of movement.

Figure 4, is a bottom plan view of the movable seat detached from the vehicle.

Figure 5, shows in a bottom plan view, a detached portion of the body of the vehicle, showing the mechanism thereon which operates to maintain the movable seat in a plane parallel with the body at all times.

Figures 6 and 7, illustrate respectively, a bottom plan view and a side elevation of the casting which hold the studs that depend from the movable seat, in rigid relation with each other.

Figures 8 and 9, illustrate enlarged detail views of part of the mechanism shown in Figure 5.

Figure 10, illustrates an end elevation of the spool shaped pulley mounted upon the shaft upon which the wheels of the vehicle are mounted.

Figure 11, shows in side elevation the spool shaped pulley together with a portion of the shaft upon which it is mounted.

Figure 12, illustrates a longitudinal sectional view of the parts shown in Figure 11, to more clearly show the several parts comprised therein and otherwise hidden from view.

Figures 13 and 14, illustrate respectively in a plan and an edge view, a device to adjustably secure the forward end of the actuating cord to the lower surface of the vehicle body.

Similar numerals and letters of reference in the several figures of the drawings, denote similar parts.

I employ, in the present embodiment of my invention, as the main support and body upon and through which the sevral elements comprised in said invention are to be mounted and operated, the ordinary construction at present employed in vehicles especially adapted to the use of children and known to the art under various names and which consists esssentially in a body A, mounted at its forward end upon a single wheel B, journaled in the enlarged bifurcated lower end of a shaft 2, which—purposely reduced in diameter at 3, to bear against a washer 4, interposed between the shoulder thus formed on the lower portion of the shaft 2, and the bottom surface of the body A—extends thence and is provided upon its upper end with a transversely extending handle or steering bar 5, through which the wheel B, is turned to guide direction of the vehicle.

I provide the shaft 2, above the body A, with a short sleeve 6, which, apertured to closely fit the shaft 2, bears at its lower end upon a metal washer 7, which rests upon the upper surface of the body A, as shown, a screw threaded bolt 8, extends through said sleeve and the shaft therewithin and operates to maintain rigidity between the shaft 2, and the body A, while permitting easy rotation of the shaft 2.

I provide that the body A, shall at its rear end be provided, upon each of its opposite sides, with a wheel C, and to such end I mount a shaft 9, at its opposite ends respectively, in supports 10, and 11, which depend from the opposite sides of said body A, and each of which—when said wheels C, are mounted upon the opposite ends of the shaft 9, journaled therein—bear lightly upon the inner end of the hub of the wheel nearest thereof. I further provide that the hub of one of said wheels C, shall be rigidly secured to the shaft 9, upon which it is mounted.

As has been hereinbefore stated, the main or primary purpose of my invention is the provision of a vehicle which, through the downward pressure, due to the weight of a child upon a specially designed mechanism which forms a part of such vehicle, is to be propelled forward for a predetermined distance, and further, that, when such distance has been attained, said vehicle may be forwardly propelled to any desired distance by its rider through the means as present employed for such purpose.

To the end named, I provide that the wheel supporting body A, comprised in my invention shall, in outline, approximate those of the well known vehicles now used by children, that is to say, shall for a portion of its length—that part toward the rear end thereof—project at its side edges outwardly as shown in Fig. 11, to ensure the necessary strength of construction for the purposes of my invention and that such laterally enlarged portion of said body A, shall be provided rectangular shaped apertures 12, for the passage of studs 13, 14, 15 and 16, rectangular shaped in cross section which depend from the lower surface of a movable seat 17, to and through the apertures 12, and are therebelow, connected together, as shown in Figure 7, both for the purpose of imparting a rigidity of construction to the depending studs noted, and for the purpose of affording a suitable support for the journal bearings 18, of a grooved pulley 19, which is connected to be moved upward and downward by the movement of the movable seat 17, for a purpose presently to be explained.

I preferably employ, for the purpose of connecting the lower ends of the studs 13, 14, 15 and 16, together, as well as for the formation of the journal bearings 18, wherein the shaft 20, is to be mounted, a single light casting of iron, since thereby there is not only a greater degree of strength, rigidity and durability assured to the connection and maintenance of the studs 13, 14, 15 and 16, in proper position, but also that the continuous maintenance of alignment of the pulley 19, with its coacting devices is absolutely assured.

I provide that the upper surface of the movable seat 17, shall at all times and under all conditions, be maintained in a plane absolutely parallel with the plane of the upper surface of the body A, of the vehicle, to which end I arrange that each of the studs 13, 14, 15 and 16, shall, upon the sides thereof designated by the letter m, be provided with a gear rack 21, to be engaged by pinions 22, which are rigidly secured—in pairs—upon and near the opposite ends of shafts 23, that are journaled upon the lower surface of the body A.

I provide that the shafts 23, shall be three in number and so placed—with relation with the studs 13, 14, 15 and 16,—that the pinions 22 upon the first shaft thereof, shall closely engage with the gear rack upon the side m, of each of the studs 13 and 14, that the pinions 22 upon the second shaft, shall closely engage with the gear rack upon the side m, of each of the studs 15, and 16, and finally that the pinions 22, upon the third and last shaft shall closely engage the gear racks upon the forward sides m, of the the studs 14, and 16.

It is to be understood that the gear racks 21, upon the several studs 13, 14, 15 and 16, are to be in length, not less than three-fourths of one inch longer than the limit of the up and down movement of the movable seat 17.

From the foregoing described construction of the movable seat 17, its depending studs and the mechanism which controls the action thereof, it will be readily understood that the several studs 13, 14, 15 and 16, will operate in absolute synchronism each with the other and that, because of such action, the movable seat 17, will at all times and without regard to the disposition of the weight thereupon, move in a plane parallel with the surface of the body A, of the vehicle.

I provide that the downward movement of the movable seat 17, due to the weight of a child thereupon, will operate to move the vehicle in forward direction for a predetermined distance, to which end I rotatably mount a grooved pulley 24, within a recess 25, formed in the lower surface of the movable seat 17, to receive a cord 26, which, secured at one end 27, to the upper surface of the body A, extends thence over the grooved pulley 24, to and around a spool like pulley 28, which I purposely make of wood suitable therefor, and provide, at its opposite ends respectively, with steel discs 29, having enlarged central portions 30, to be apertured for the passage of the shaft 9, upon which the rear wheels C, of the vehicle are mounted, screws which extend through said discs 29, secure them to the pulley 28.

I provide that the pulley 28, shall be mounted to freely turn in one direction— that indicated by the arrow a,—upon the shaft 9, of the rear wheels C, of the vehicle and held from rotation in the opposite direction upon said shaft by a pawl 31, which hinged at 32, to one end of said pulley 28, engages teeth 33, upon a ratchet wheel 34, that is rigidly secured to the shaft 9, a spring 35, secured to the end of the pulley 28, operates to hold the pawl 31, upon which it bears, in contact with the teeth of the ratchet wheel 34.

I preferably wind the cord 26, a number of times around the spool like pulley 28, and from thence extend said cord over a grooved pulley 36, mounted in supports 37, that depend from the lower surface of the body A, and the grooved periphery of the pulley 19, to and secure its end within the grip of an adjustable device 38, adapted to hold said cord at a predetermined tension and consisting essentially in a metal plate having a bifurcated forward end 39, curved to securely hold the knotted end of the cord 26, and provided with slots 40, through which screws 41, extend to secure the device to the bottom of the body A.

From the foregoing described arrangement of the cord 26, as regards the main operative elements comprised in my invention, it will be readily understood that downward pressure upon said cord, through the medium of the movable seat 17, and its connected pulley 19, will operate to rotate shaft 9, and the wheel C, rigidly connected thereto and move the vehicle in forward direction.

I provide that the movable seat 17, shall, upon the removal of weight therefrom, be automatically returned to its upward limit of movement, to which end I employ a lever 42, which hinged at 43, in suitable journal bearings 44, secured to the body A, swings upwardly and downwardly in a slot 45, formed through the body A, and is provided at its rear end 46, with an upwardly projecting link 47, which is hinged at 48, to the movable seat 17, near the rear end thereof. I provide the forward end of the lever 42, with an adjustable counter weight 49, which—preferably of weight sufficient to overbalance and move the seat upwardly immediately upon the removal of downward pressure upon said seat—may be adjusted upon the lever 42, to increase or decrease the lifting power of said lever, as will be readily understood. If desired, a strong spiral spring may be substituted for the weight 49.

It will be understood that the lever 42, and its connected devices may if desired be hinged to the body or frame A, below said body or frame and connected to be hinged to the pendent studs to move them upward as described. I provide the body or frame A, at its front end with a rubber buffer 50, to prevent accidents.

While I have, in the present adaptation of my invention, employed a cord 26, as the medium through which the downward movement of the seat 17, is applied to rotate the shaft 9, and its connected wheel C, I yet do not confine myself to the use of cord 26, alone since other mediums than such cord may be employed for such purpose as for instance, a strap of leather or a flexible chain of metal. Further a coiled spring surrounding each of the studs depending from the movable seat 17, may be used for the purpose of returning said seat to its normal starting position, in lieu of the lever 42, since in each of the modifications noted, a result approximately that which follows the use of the means hereinbefore set forth may be brought about.

Modifications other than those named, may be suggested by the study of the present embodiment of my invention in view of which, I claim the right to use such thereof as fall within the scope and limit of the claims hereinafter to be set forth.

Having thus described my invention, I claim and desire to secure by Letters Patent.

1. In a gravity mobile vehicle a body or frame mounted at one of its ends upon a rotatable wheel bearing shaft, a wheel immovably journaled upon one end of said shaft to be turned thereby, a vertically movable seat upon said body or frame, and a flexible connection comprising a cord or rope extending between said body or frame and said rotatable wheel bearing shaft and adapted to be acted upon and moved downwardly by the downward movement of said movable seat to rotate said wheel bearing shaft and thereby move said vehicle in forward direction, substantially as described.

2. In a gravity mobile vehicle a body or frame mounted at one of its ends upon a rotatable wheel bearing shaft, a wheel immovably journaled upon said shaft to be turned thereby, a flexible connection comprising a cord or rope between said body or frame and said rotatable wheel bearing shaft to rotate said shaft and its connected wheel upon the application of downward pressure upon said cord or rope, a vertically movable seat upon said body or frame, and a rotatable pulley journaled in supports depending from said seat to bear upon said cord or rope and thereby through the downward movement thereof to rotate the wheel bearing shaft and thereby move the vehicle in forward direction, substantially as described.

3. In a gravity mobile vehicle comprising a body or frame mounted at one of its opposite ends upon a shaft having a wheel immovably journaled upon and connected to be positively rotated by the rotation of said shaft through the action thereupon of a cord or rope which secured at one end to said body or frame extends thence to and about a pulley upon said shaft, a vertically movable seat above and provided with depending supports which extend downwardly to and through said body or frame and are provided therebelow with a pulley having a grooved periphery to engage and impart downward pressure from said movable seat to and upon the cord or rope and thereby rotate said shaft and its connected wheel to move the vehicle, and a cord or rope positively secured at its opposite ends to the body or frame and connected to be moved to rotate the shaft and its connected wheel through pressure applied thereto by the downward movement of the movable seat, substantially as described.

4. In a gravity mobile vehicle a body or frame mounted at one of its ends upon a rotatable shaft having a wheel immovably journaled upon one end thereof to be turned thereby, a vertically movable seat upon said body or frame, a flexible connection comprising a cord or rope between said body or frame and said rotatable shaft to be moved by the downward movement of the movable seat and to thereby rotate said shaft and the wheel immovably journaled thereupon, and means to continuously maintain the surface of said movable seat in a plane absolutely parallel with the plane of the body of frame of the vehicle, substantially as described.

5. In a gravity mobile vehicle a body or frame mounted at one of its ends upon a rotatable shaft having a wheel immovably journaled upon one end thereof to be turned thereby, a single wheel vertically journaled at the opposite end of said body or frame to control direction of movement of the same, a vertically movable seat upon said body or frame having depending studs extending therefrom to and through said body or frame, said depending studs, a single casting upon the lower ends of said studs to connect the same together, a pulley upon said casting to bear upon and depress a flexible connection comprising a cord or rope extending between said body or frame and its supporting shaft to rotate said shaft upon the downward movement of the vertically moving seat and thereby move the vehicle in forward direction, substantially as described.

6. In a gravity mobile vehicle a body or frame mounted at one of its ends upon a rotatable shaft having a wheel immovably mounted upon one end thereof to be turned thereby, a single wheel journaled at the opposite end of said body or frame to control direction of movement of the same, a vertically movable seat upon said body or frame having studs extending therefrom to and through said body or frame, said depending studs, a single casting upon the lower ends of said studs, a pulley mounted upon said casting to bear upon and depress a cord or rope extending from said body or frame to and around a shaft upon which said body or frame is mounted to rotate said shaft, and mechanism connected with the studs that depend from the movable seat to continuously maintain the upper surface of said seat in planes absolutely parallel with the upper surface of the body or frame during its movement toward and from said body or frame, substantially as described.

7. In a gravity mobile vehicle a body or frame mounted at one of its ends upon a rotatable shaft having a wheel immovably mounted upon one end thereof to be turned thereby, a vertically movable seat above and provided with depending studs which extend to and through the body or frame of the vehicle and are connected together therebelow, a gear rack upon one face of each side pair of said studs, a shaft to be mounted upon the body or frame parallel with each side pair of said studs, a gear pinion immovably mounted upon and near the opposite ends of each of said shafts and so placed that the pinions upon one shaft shall engage with the gear racks of one pair of studs located upon the same side of the seat to move said studs in synchronism, substantially as described.

8. In a gravity mobile vehicle having a body or frame mounted at one of its ends upon a rotatable shaft having a wheel immovably mounted upon one of its ends to be rotated thereby, a vertically movable seat above and provided with depending studs which extend to and through the body or frame of the vehicle and are connected therebelow by a casting having a rotatable pulley thereupon, a gear rack and pinion connection between the studs located upon the same side of the seat to ensure synchronism of movement therebetween, a gear rack upon the forward face of the forward stud of each side pair, a shaft mounted upon the body or frame of the vehicle parallel with the front faces of said forward studs, a gear pinion immovably mounted upon and near the opposite ends of said shaft to engage respectively the gear racks upon said forward studs and thereby move the pair of studs upon one side of the movable seat in synchronism with the pair of studs upon the opposite side of said seat, substantially as described.

9. In a gravity mobile vehicle a body or frame mounted at one of its ends upon a rotatable shaft having a wheel immovably mounted upon said shaft to be moved thereby, a vertically movable seat above and provided with depending studs which extend to and through the body or frame of the vehicle and are connected by a casting therebelow, a pulley upon said casting to engage a cord or rope which extends from the body or frame to and around a pulley mounted upon the shaft upon which the body or frame of the vehicle is mounted to rotate the same when downward pressure is applied upon said seat, means to positively and continuously maintain the upper surface of said movable seat in planes absolutely parallel with the upper surface of said body or frame during its movement toward the same, and means to automatically return the movable seat to its normal starting position upon the removal of downward pressure therefrom, substantially as described.

10. In a gravity mobile vehicle a body or frame mounted upon rotatable wheels to move thereon, a downwardly movable seat mounted to be moved toward the body or frame by the weight of a child thereupon, a flexible connection comprising a cord or rope connected to said body or frame and extending thence to and about a pulley mounted upon one of the supporting wheel shafts of the body or frame, a device connected to said downwardly movable seat to impinge upon and depress the cord or rope and thereby move the vehicle in forward direction, a counterpoise to return the movable seat to normal starting position upon the removal of weight therefrom, and a buffer upon the forward end of said body or frame to guard against accident, substantially as described.

11. In a gravity mobile vehicle a body or frame mounted upon rotatable wheels to move thereon, a vertically movable seat mounted to move toward and from said body or frame, depending studs connected to move to and through said body or frame and provided at their lower ends with a casting to connect said studs together and to support a rotatable pulley, a rotatable pulley mounted upon one of the body or frame supporting wheel shafts, a pawl and ratchet connection between said pulley and the shaft upon which it is mounted to permit free movement of the pulley upon said shaft in one direction and hold said pulley from rotation in the opposite direction, a flexible connection comprising a cord or rope which connected to the upper surface of the body or frame extends thence to and about a pulley rotatably mounted upon the lower surface of the movable seat thence to and about the pulley upon the supporting shaft of the body or frame thence to and about a pulley upon the lower surface of said body or frame and thence about a pulley journaled upon the casting at the lower ends of the studs depending from the movable seat to the adjustable cord holding device 38 upon the bottom of the body or frame, in combination with means to positively maintain the surfaces of the body or frame and the movable seat in planes absolutely parallel with other during the movement of the movable seat toward and from said body or frame, and means to automatically return the movable seat to its normal starting position upon the removal of its actuating weight therefrom, substantially as described.

12. In a gravity mobile vehicle a body or frame mounted upon rotatable wheels to move thereon, a vertically movable seat having depending studs to be moved to and through said body or frame and having a casting upon the lower ends of said studs to secure them together and to provide a support for a rotatable pulley, a pulley journaled upon said casting to impinge upon a flexible connection comprising a cord or rope secured at one of its ends to the lower surface of the body or frame and extending thence to and coiled around the pulley upon the supporting shaft of the body or frame, in combination with means to continuously maintain the surface of the vertically moving seat in a plain parallel with the plane of the surface of the body or frame, and means comprising a lever hinged to the body or frame and having one of its arms connected to the movable seat and the remaining arm provided with an adjustable weight to automatically return said seat to normal starting position upon the removal of downward pressure from said seat, substantially as described.

In testimony whereof I hereto affix my signature.

ROY K. DENNISON.